United States Patent Office 2,973,375
Patented Feb. 28, 1961

2,973,375

12α-HALO-11,21-BIS-OXYGENATED-1,4-PREGNADIENE-3,20-DIONES

Norman L. Wendler, Summit, and David Taub, Metuchen, N.J., assignors to Merck & Co., Inc., Rahway, N.J., a corporation of New Jersey No Drawing. Filed Dec. 13, 1955, Ser. No. 552,730

10 Claims. (Cl. 260—397.45)

This invention is concerned generally with novel steroid compounds and with processes of preparing them. More particularly, it relates to 12α-halo-Δ$^{1,4}$-3,20-diketo-11,21-bis-oxygenated-pregnadiene compounds and to the process of preparing these compounds starting with the corresponding 12α-halo-Δ$^4$-3,20-diketo-11,21-bis-oxygenated-pregnene compound. These novel 12-α-halo-Δ$^{1,4}$-3,20 - diketo - 11,21 - bis - oxygenated-pregnadiene compounds possess 3-10 times the activity of hydrocortisone and are particularly valuable for the treatment of allergic skin irritations.

These novel 12α-halo-Δ$^{1,4}$-3,20-diketo-11,21-bis-oxygenated-pregnadiene compounds, subject of the present invention, may be chemically represented as follows:

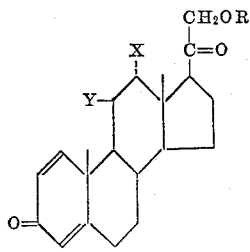

wherein R is hydrogen or an acyl radical, X is a halo radical, and Y is a hydroxy or keto radical.

The 12α - halo - Δ$^{1,4}$ - 3,20 - diketo - 11,21 - bis - oxygenated-pregnadiene compounds may be prepared by contacting the corresponding 12α-halo-Δ$^4$-3,20-diketo-11,21-bis-oxygenated-pregnene compound with the dehydrogenating activity of Bacillus sphaericus microorganisms. The species Bacillus sphaericus as defined in Bergey's Manual for Determinative Bacteriology, 6th edition, comprises several varieties such as the rotans variety, the fusiformis variety, etc. and, in some collections, these varieties are referred to by the species names Bacillus rotans and Bacillus fusiformis. These Bacillus sphaericus microorganisms can be obtained from known sources such as the American Type Culture Collection, Washington, D.C., or they may be isolated from natural sources, such as soil, by known methods.

The 12α-halo-Δ$^4$-3,20-diketo-11,21-bis-oxygenated-pregnenes used as starting materials in this process are conveniently prepared from the known 12α-bromodehydrocorticosterone (12α-bromo-Δ$^4$-3,11,20-triketo-21-hydroxy-pregnene) as follows: Using the experimental conditions described in U.S. Patent 2,628,966, the 12α-bromo-Δ$^4$-3,11,20-triketo-21-hydroxy-pregnene is reacted with excess semicarbazide to form 12α-bromo-Δ$^4$-3,11,20-triketo-21-hydroxy-pregnene 3,20-bis-semicarbazone; this 3,20-bis-semicarbazone is reacted with lithium borohydride in tetrahydrofuran to form 12α-bromo-Δ$^4$-3,20-diketo-11β, 21-dihydroxy-pregnene 3,20-bis-semicarbazone; the latter compound is then reacted with a hydrolyzing agent to form 12α-bromo-Δ$^4$-3,20,-diketo-11β,21-dihydroxy-pregnene. This 12α-bromo-Δ$^4$-3,20-diketo-11β,21-dihydroxy-pregnene is converted to other 12α-halo derivatives by reacting the 12α-bromo compound with a base to produce the corresponding Δ$^4$-3,20-diketo-11β,12β-oxido-21-hydroxy-pregnene, reacting the latter compound with an acylating agent e.g., a lower alkanoic anhydride such as acetic anhydride, in the usual manner to form Δ$^4$-3,20-diketo-11β,12β-oxido-21-acyloxy-pregnene, and reacting the latter compound with a hydrohalic acid, e.g. hydrofluoric acid, hydrochloric acid, etc., to form the corresponding 12α - halo - Δ$^4$-3,20-diketo-11β-hydroxy-21-acyloxy-pregnene as for example 12α-fluoro-Δ$^4$-3,20-diketo-11β-hydroxy-21-(lower alkenoyloxy)-pregnene, 12α-fluoro-Δ$^4$-3,20-diketo-11β-hydroxy-21-acetoxy-pregnene, 12α-fluoro - Δ$^4$ - 3,20-diketo-11β-hydroxy-21-acetoxy-pregnene, 12α - fluoro - Δ$^4$ - 3,20-diketo-11β-hydroxy-21-propionoxy-pregnene, 12α - fluoro-Δ$^4$-3,20-diketo-11β-hydroxy-21-benzoxy-pregnene, 12α-chloro-Δ$^4$-3,20-diketo-11β-hydroxy-21-(lower alkanoyloxy)-pregnene, 12α-chloro-Δ$^4$-3,20-diketo-11β-hydroxy-21-acetoxy-pregnene, and the like. Alternatively, the Δ$^4$-3,20-diketo-11β,12β-oxido-21-hydroxy-pregnene may be reacted with a hydrohalic acid to form the corresponding 12α-halo-Δ$^4$-3,20-diketo-11β,21-dihydroxy-pregnene, such as 12α-fluoro-Δ$^4$-3,20-diketo-11β,21-dihydroxy-pregnene, 12α-chloro-Δ$^4$-3,20-diketo-11β,21-dihydroxy-pregnene, and the like. When this 12α-halo-Δ$^4$-3,20-diketo-11β-hydroxy-21-acyloxy-pregnene is reacted with chromium trioxide in acetic acid it is converted to the corresponding 12α-halo-Δ$^4$-3,11,20-triketo-21-acyloxy-pregnene, as for example 12α-fluoro-Δ$^4$-3,11,20-triketo-21-(lower alkanoyloxy)-pregnene, 12α-fluoro-Δ$^4$-3,11,20-triketo-21-acetoxy-pregnene, 12α-fluoro-Δ$^4$-3,11,20-triketo-21-propionoxy-pregnene, 12α-chloro-Δ$^4$-3,11,20-triketo-21-(lower alkanoyloxy)-pregnene, 12α-chloro-Δ$^4$-3,11,20-triketo-21-acetoxy-pregnene, and the like; these 12α - halo-Δ$^4$-3,11,20-triketo-21-acyloxy-pregnenes are readily hydrolyzed by methanolic potassium hydroxide to form 12α-halo-Δ$^4$-3,11,20-triketo-21-hydroxy-pregnenes such as 12α-fluoro-Δ$^4$-,3,11,20-triketo-21-hydroxy-pregnene, and 12α-chloro-Δ$^4$-3,11,20-triketo-21-hydroxy-pregnene.

The Δ$^1$-dehydrogenation of the 12α-halo-Δ$^4$-3,20-diketo-11,21-bis-oxygenated-pregnene [e.g. 12αhalo-Δ$^4$-3,11,20-triketo-21-(hydroxy or acyloxy)-pregnene or 12α-halo-Δ$^4$-3,20-diketo-11β-hydroxy - 21 - (hydroxy or acyloxy)-pregnene] is conveniently effected by adding the steroid compound as a solid, or as a solution in a solvent as for example a dialkyl ketone such as acetone, a dialkyl-formamide such as dimethyl-formamide, and the like, under sterile conditions to a culture of the microorganism in a nutrient medium and agitating the resulting mixture thereby bringing about growth of the microorganism and dehydrogenation of the steroid compound. The steroid can be added at the time the nutrient medium is inoculated with the culture of Bacillus sphaericus microorganisms or, alternatively may be added to an established culture. It is ordinarily preferred to add the 12α-halo-Δ$^4$-3,20-diketo-11,21-bis-oxygenated-pregnene to a nutrient medium containing a 24-hour growth of Bacillus sphaericus microorganisms. The proportion of steroid compound which may be added to the medium varies depending upon the particular substrate being dehydrogenated, but it is ordinarily preferred to employ a concentration of about 0.005% to 0.2% of steroid, although higher or lower concentrations may be employed, if desired. The culture containing the 12α-halo-Δ$^4$-3,20-diketo-11,21-bis-oxygenated-pregnene is then incubated, preferably with agitation and aeration for an additional period of approximately 24 hours.

The nutrient mediums used in carrying out this bacteriological dehydrogenation are those ordinarily utilized in the propagation of Bacillus sphaericus microorganisms. The usual nutrients include a nitrogen and carbon source, inorganic salts and growth factors when required. The carbon can be provided by compounds such as acetates, lactates, and the like. Carbohydrates are poorly utilized by Bacillus sphaericus and may be included in the medium or omitted without seriously affecting the steroid dehydrogenation. The nitrogen can be provided by an ammonium salt, amino acids, or proteins such as soy beans, oats, yeast, yeast extracts, tryptic digest of casein, meat extract, blood meal, protein meat and bone scrap, salmon meal, fish meals, fish solubles, distillers solubles, and the like. If desired, the Bacillus sphaericus microorganisms can be propagated using proteins (or amino acids) without any carbohydrate being present in the medium, in which case the proteins or amino acids serve as the source of both the carbon and nitrogen required by the microorganisms.

Irrespective of whether the starting material employed in this microbiological dehydrogenation reaction is a 12α-halo-$\Delta^4$-3,20-diketo-11-oxygenated-21-hydroxy-pregnene or a 21-ester thereof, the product obtained is the corresponding 12α-halo-$\Delta^{1,4}$-3,20-diketo-11-oxygenated-21-hydroxy-pregnadiene since any 21-ester grouping which may be present is hydrolyzed during the dehydrogenation reaction. After completion of the dehydrogenation process, the product is conveniently recovered from the fermented broth by extraction with a water-immiscible solvent as for example a chlorinated hydrocarbon such as chloroform, a ketone such as methyl isobutyl ketone, an alkyl alkanoate such as ethyl acetate, and the like. The extract of $\Delta^1$-dehydrogenated steroid product and any unreacted starting material which may be present is conveniently purified by chromatography using silica gel, activated alumina, and the like or, if desired by means of descending paper chromatograms. After separation of the dehydrogenated product from unreacted starting material, the product can be purified further, if desired by recrystallization from a solvent such as ethyl acetate, ethyl acetate-petroleum ether, and the like.

In accordance with this microbiological dehydrogenation method, there are obtained 12α-halo-$\Delta^{1,4}$-3,20-diketo-11-oxygenated-21-hydroxy-pregnadienes as, for example, 12α-halo-$\Delta^{1,4}$-3,20-diketo-11β,21-dihydroxy-pregnadienes such as 12α-fluoro-$\Delta^{1,4}$-3,20-diketo-11β,21-dihydroxy-pregnadiene, 12α-chloro-$\Delta^{1,4}$-3,20-diketo-11β,21-dihydroxypregnadiene, 12α-halo-$\Delta^{1,4}$-3,11,20-triketo-21-hydroxypregnadienes such as 12α-fluoro-$\Delta^{1,4}$-3,11,20-triketo-21-hydroxy-pregnadiene, 12α-chloro-$\Delta^{1,4}$-3,11,20-triketo-21-hydroxy-pregnadiene, and the like. These 21-free alcohols can be converted to the corresponding 21-esters by reaction with an acylating agent e.g., a lower alkanoic anhydride such as acetic anhydride, and the like thereby forming the 12α-halo-$\Delta^{1,4}$-3,20-diketo-11-oxygenated-21-acyloxy-pregnadienes as, for example, 12α-halo-$\Delta^{1,4}$-3,20-diketo-11β-hydroxy-21-acyloxy-pregnadiene, 12α-halo-$\Delta^{1,4}$-3,20-diketo-11β-hydroxy-21-(lower alkanoyloxy)-pregnadiene, 12α-fluoro-$\Delta^{1,4}$-3,20-diketo-11β-hydroxy-21-(lower alkanoyloxy)-pregnadiene, 12α-fluoro-$\Delta^{1,4}$-3,20-diketo-11β-hydroxy-21-acetoxy-pregnadiene, 12α-fluoro-$\Delta^{1,4}$-3,20-diketo-11β-hydroxy-21-propionoxy-pregnadiene, 12α-fluoro-$\Delta^{1,4}$-3,20-diketo-11β-hydroxy-21-benzoxy-pregnadiene, 12α-chloro-$\Delta^{1,4}$-3,20-diketo-11β-hydroxy-21-(lower alkanoyloxy)-pregnadiene, 12α-chloro-$\Delta^{1,4}$-3,20-diketo-11β-hydroxy-21-acetoxy-pregnadiene, 12α-halo-$\Delta^{1,4}$-3,11,20-triketo-21-acyloxy-pregnadiene, 12α-halo-$\Delta^{1,4}$-3,11,20-triketo-21-(lower alkanoyloxy-pregnadiene, 12α-fluoro-$\Delta^{1,4}$-3,11,20-triketo-21-(lower alkanoyloxy)-pregnadiene, 12α-fluoro-$\Delta^{1,4}$-3,11,20-triketo-21-acetoxy-pregnadiene, 12α-fluoro-$\Delta^{1,4}$-3,11,20-triketo-21-propionoxy-pregnadiene, 12α-fluoro-$\Delta^{1,4}$-3,11,20-triketo-21-benzoxy-pregnadiene, 12α-chloro-$\Delta^{1,4}$-3,11,20-triketo-21-(lower alkanoyloxy)-pregnadiene, 12α-chloro-$\Delta^{1,4}$-3,11,20-triketo-21-acetoxy-pregnadiene, and the like.

The following examples illustrate methods of carrying out the present invention, but it is to be understood that these examples are given for purposes of illustration and not of limitation.

Example 1

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make | ml | 50 |

This medium is adjusted to pH 6.5 with KOH, sterilized and inoculated with about 2.5 to 5 ml. of a culture of Bacillus sphaericus (MB 431) microorganisms, and the inoculated culture is then incubated at a temperature of 28° C., with agitation, for a 24-hour period. To the resulting culture is added a solution containing 10 mg. of 12α-fluorocorticosterone acetate (12α-fluoro-$\Delta^4$-3,20-diketo-11β-hydroxy-21-acetoxy-pregnene) dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated to dryness in vacuo. The residual material is dissolved in acetone and treated with charcoal and diatomaceous earth to remove colored impurities. The decolorized acetone solution is then streaked on paper chromatograms which are developed using formamide as the stationary phase and chloroform as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 12α-fluoro-$\Delta^{1,4}$-3,20-diketo-11β,21-dihydroxy-pregnadiene.

The 12α-fluoro-$\Delta^{1,4}$-3,20-diketo-11β,21-dihydroxy-pregnadiene is acetylated with acetic acid anhydride and pyridine in the usual manner to give the 21-acetyl derivative, which is purified by recrystallization from acetone-petroleum ether to give substantially pure 12α-fluoro-$\Delta^{1,4}$-3,20-diketo-11β-hydroxy-21-acetoxy-pregnadiene; M.P. 218–222° C.;

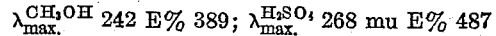

$\lambda_{max.}^{CH_3OH}$ 242 E% 389; $\lambda_{max.}^{H_2SO_4}$ 268 mu E% 487 polarity on paper chromatography slightly greater than 12α-fluorocorticosterone acetate.

Example 2

Fifty milliliters of a nutrient medium are prepared having the following composition:

| | | |
|---|---|---|
| Cerelose | g | 1 |
| Edamin | g | 1 |
| Cornsteep liquor | ml | 0.25 |
| Distilled water to make | ml | 50 |

This medium is adjusted to pH 6.5 with KOH, sterilized and inoculated with about 2.5 to 5 ml. of a culture of Bacillus sphaericus (MB 431) microorganisms, and the inoculated culture is then incubated at a temperature of 28° C., with agitation, for a 24-hour period. To the resulting culture is added a solution containing 10 mg. of 12α-fluoro-$\Delta^4$-3,11,20-triketo-21-acetoxy-pregnene dissolved in 0.2 ml. of dimethylformamide. The culture containing the steroid compound is incubated, with agitation, for an additional period of about 24 hours at 28° C.

The fermentation broth is extracted with four 50 ml.-portions of ethyl acetate, and the ethyl acetate extracts are combined and evaporated to dryness in vacuo. The residual material is dissolved in acetone and treated with charcoal and diatomaceous earth to remove colored impurities. The decolorized acetone solution is then streaked on paper chromatograms which are developed using formamide as the stationary phase and chloroform as the mobile phase. The upper bands for each chromatogram, corresponding to the $\Delta^1$-dehydro derivative, are cut off, extracted with methanol, and the methanol-extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 12α-fluoro-$\Delta^{1,4}$-3,11,20-triketo-21-hydroxy-pregnadiene.

The 12α-fluoro-$\Delta^{1,4}$-3,11,20-triketo-21-hydroxy-pregnadiene is acetylated with acetic anhydride and pyridine in the usual manner to give the 21-acetyl derivative, which is purified by recrystallization from benzene-petroleum ether to give substantially pure 12α-fluoro-$\Delta^{1,4}$-3,11,20-triketo-21-acetoxy-pregnadiene.

*Example 3*

The fermentation procedures of Examples 1 and 2 are repeated but using, in place of the *Bacillus sphaericus* (MB 431) microorganisms and the 12α-fluoro-$\Delta^4$-3,20-diketo (11β-hydroxy and 11-keto)-21-acetoxy-pregnadiene starting materials employed in those examples, the microorganism strains and steroid starting compounds indicated in the table hereinbelow. The resulting fermentation broths were treated in accordance with the isolation methods described in Examples 1 and 2 to give, for the particular microorganism strain and steroid substrate used, the 12α-halo-$\Delta^{1,4}$-3,20-diketo-11-oxygenated-21-hydroxy-pregnadiene indicated in the following table:

| Expt. No. | Substrate | *Bacillus sphaericus* strain | 12α-Halo-$\Delta^{1,4}$-3,20-Diketo-11-Oxygenated-21-Hydroxy-Pregnadiene Obtained |
|---|---|---|---|
| 1 | 12α-Fluoro-$\Delta^4$-pregnene-11β,21-diol-3,20-dione. | *B. sphaericus*-ATCC-7054: fusiformis variety sometimes called *B. fusiformis*. | 12α-Fluoro-$\Delta^{1,4}$-pregnadiene-11β,21-diol-3,20-dione. |
| 2 | 12α-Fluoro-$\Delta^4$-pregnene-11β,21-diol-3,20-dione 21-acetate. | *B. sphaericus*-ATCC-7055; fusiformis variety sometimes called *B. fusiformis*. | Do. |
| 3 | 12α-Chloro-$\Delta^4$-pregnene-11β,21-diol-3,20-dione. | *B. sphaericus*-ATCC-245. | 12α-Chloro-$\Delta^{1,4}$-pregnadiene-11β,21-diol-3,20-dione. |
| 4 | 12α-Fluoro-$\Delta^4$-pregnene-21-ol-3,11,20-trione 21-acetate. | *B. sphaericus*-ATCC-7054. | 12α-Fluoro-$\Delta^{1,4}$-pregnadiene-21-ol-3,11,20-trione. |
| 5 | 12α-Fluoro-$\Delta^4$-pregnene-21-ol-3,11,20-trione. | *B. sphaericus*-ATCC-7055. | Do. |
| 6 | 12α-Chloro-$\Delta^4$-pregnene-21-ol-3,11,20-trione 21-acetate. | *B. sphaericus*-ATCC-245. | 12α-Chloro-$\Delta^{1,4}$-pregnadiene-21-ol-3,11,20-trione. |

Various changes and modifications may be made in carrying out the present invention without departing from the spirit and scope thereof. Insofar as these changes and modifications are within the purview of the annexed claims, they are to be considered as part of this invention.

We claim:

1. A 12α-halo-$\Delta^{1,4}$-3,20-diketo-11β,21-dihydroxy-pregnadiene where the halo radical is selected from the group consisting of fluoro and chloro.

2. 12α-fluoro-$\Delta^{1,4}$-3,20-diketo-11β,21-dihydroxy-pregnadiene.

3. 12α-chloro-$\Delta^{1,4}$-3,20-diketo-11β,21-dihydroxy-pregnadiene.

4. A 12α-halo-$\Delta^{1,4}$-3,20-diketo-11β-hydroxy-21-(lower alkanoyloxy) pregnadiene where the halo radical is selected from the group consisting of fluoro and chloro.

5. 12α-fluoro-$\Delta^{1,4}$-3,20-diketo-11β-hydroxy-21-acetoxy-pregnadiene.

6. A 12α-halo-$\Delta^{1,4}$-3,11,20-triketo-21-hydroxy-pregnadiene where the halo radical is selected from the group consisting of fluoro and chloro.

7. 12α-fluoro-$\Delta^{1,4}$-3,11,20-triketo-21-hydroxy-pregnadiene.

8. A 12α-halo-$\Delta^{1,4}$-3,11,20-triketo-21-(lower alkanoyloxy) pregnadiene where the halo radical is selected from the group consisting of fluoro and chloro.

9. 12α-fluoro-$\Delta^{1,4}$-3,11,20-triketo-21-acetoxy-pregnadiene.

10. A compound represented by the formula:

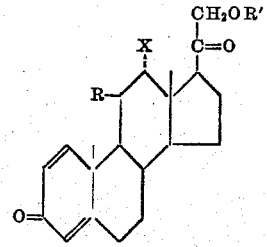

wherein R is selected from group consisting of keto and B-hydroxy, X is selected from the group consisting of fluorine and chlorine and R' is selected from the group consisting of hydrogen and hydrocarbon carbonyloxy radicals.

References Cited in the file of this patent
UNITED STATES PATENTS

| | | |
|---|---|---|
| 2,590,978 | Kendall et al. | Apr. 1, 1952 |
| 2,736,734 | Sarett | Feb. 28, 1956 |
| 2,756,179 | Fried | July 24, 1956 |